May 14, 1957 J. E. BEGGS 2,792,272

METALLIC BOND

Filed Oct. 22, 1954

Inventor:
James E. Beggs,
by Paul A. Frank
His Attorney.

United States Patent Office
2,792,272
Patented May 14, 1957

2,792,272

METALLIC BOND

James E. Beggs, Schenectady, N. Y., assignor to General Electric Company, a corporation of New York Application October 22, 1954, Serial No. 464,077
6 Claims. (Cl. 316—19)

Figures 1, 2, 3:
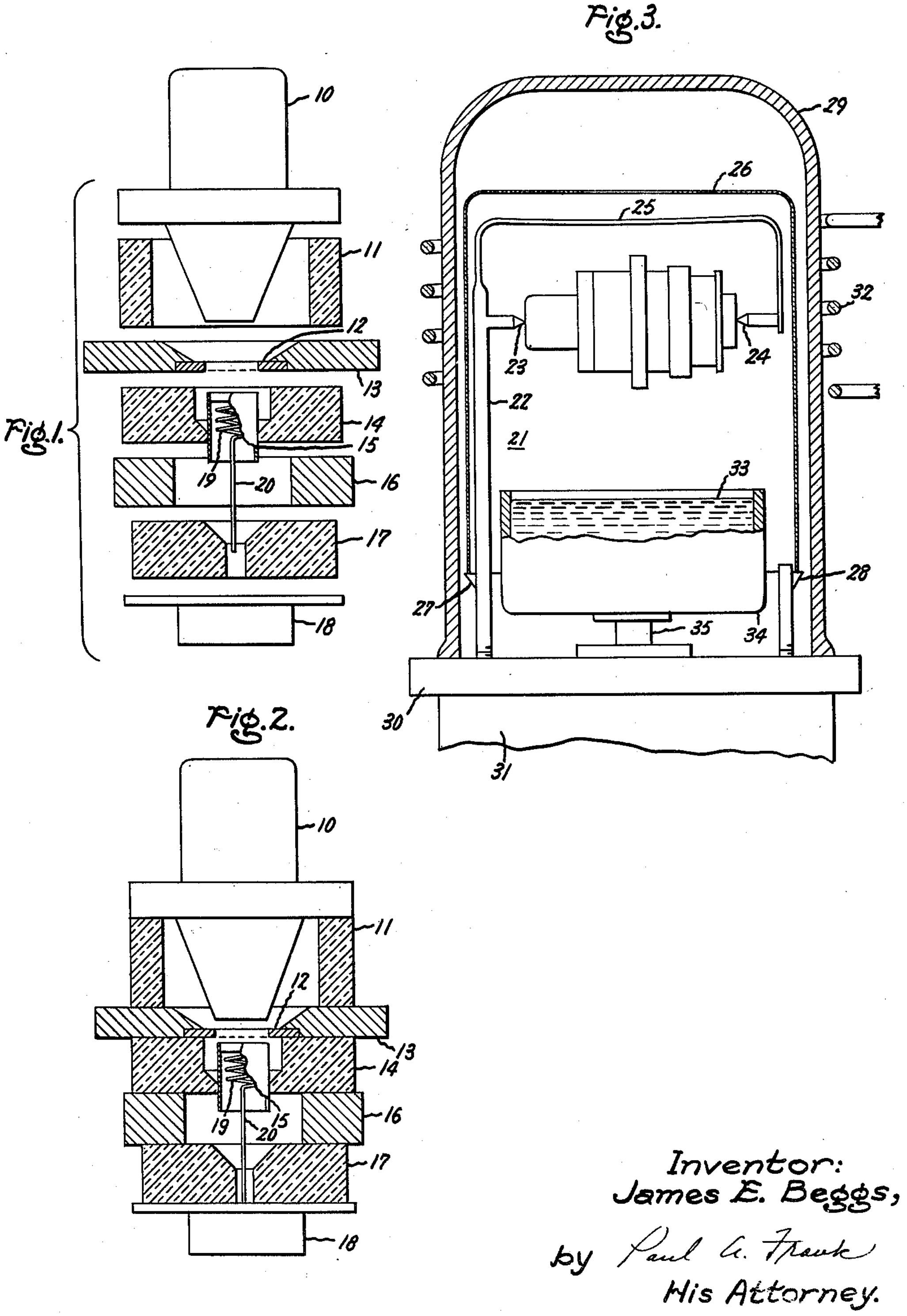

This invention relates to metallic bonds and methods of forming metallic bonds. While this invention is subject to a number of modifications and variations it is particularly suited to the fabrication and sealing of electric discharge devices and will be described in that connection.

It is particularly desirable in a formation of electric discharge devices to be able to heat the tube parts to relatively high temperatures in order to bake out all of the gases in the metal and to exhaust these gases with a suitable evacuating system.

Vacuum discharge devices, such as those disclosed in my Patent 2,680,824 which is assigned to the same assignee as this application, are often constructed of copper and ceramic parts which are sealed together by a lead soldering technique. With lead soldering techniques such as those taught in my above-mentioned patent, the exhaust temperatures can be as high as 825° C. without undue evaporation of the lead solder in the vicinity of the electric discharge device.

Other solder metals such as tin, with its lower vapor pressure, can be used at temperatures up to 1000° C. if suitable metal tube parts are used; however, because of the alloying action of tin with the tube parts when heated for a prolonged period, tin cannot be used satisfactorily at these temperatures to solder such commonly useful and easily fabricated tube parts as copper, nickel and iron and it is further undesirable because of its melting point whereby the bonds between the tube parts tend to soften at operating temperatures.

Hard solders such as gold, copper and silver can be used in connection with high bake out and exhaust temperatures, if the ceramic and metal parts of the electric discharge device which are to be soldered have reasonably similar thermal expansion characteristics, or if the metal parts are made sufficiently thin and flexible.

In accordance with an aspect of this invention it is possible to use a bake-out and exhaust temperature which is as high as the electric discharge device parts will withstand and still use lead solder. Thus, it is possible to realize the advantages of high bake-out and exhaust temperatures which are inherently possible when hard solders such as gold, copper and silver are used and with the inherent advantages of a relatively flexible soft solder such as lead or aluminum.

It is therefore an important aspect of this invention to provide an improved metallic bond and method of forming metallic bonds.

Another object of this invention is to provide an improved hermetically sealed enclosure and method of forming hermetically sealed enclosures.

A further object of this invention is to provide an improved method of high temperature degassing, exhausting and sealing vacuum enclosures without contaminating the enclosure with the bonding medium.

In accordance with this invention there is provided a method of forming a metallic bond between members which method comprises evacuating the members at a high temperature, subsequently cooling the members and applying a solder metal to at least one of the members to thereby result in a metallic bond between the members.

In accordance with an embodiment of this invention, the bonds formed between members include at least one metal from the titanium group metals which, for the purposes of this disclosure, are considered to be those metals in the group consisting of titanium, zirconium, hafnium and thorium.

The other aspects and important objects of this invention will become more apparent from the succeeding specification and claims when taken in connection with the figures of the drawing in which Figure 1 illustrates an exploded view of an electric discharge device; Figure 2 illustrates this device in assembled form and Figure 3 illustrates an example of an apparatus which may be used in the practice of this invention.

The electric discharge device illustrated in Figure 1 includes a metallic anode member and terminal 10, refractory member 11, control electrode 12, control electrode terminal 13, refractory disk and cathode retainer 14, cathode 15, cathode terminal 16, refractory disk and spacer 17 and heater terminal 18. Cathode 15 is provided with heater 19 from which heater lead 20 extends to make electrical and mechanical contact with heater terminal 18 when the tube is in assembled form.

The metal parts of the electric discharge device may consist of any one or a combination of metals customarily used in the construction of electric discharge devices, such as, but not be limited to, the metals copper, nickel, iron, chromium, molybdenum, cobalt, tantalum, titanium, zirconium and various alloys thereof. The refractory materials utilized in the practice of this invention consist of any satisfactory ceramic material such as those materials customarily classified as aluminas, forsterites, steatites or beryllias or any other refractory material capable of withstanding relatively high temperatures without undue softening and sublimation at high bake out and exhaust temperatures.

The completed electric discharge device is fabricated by coating the surface of the various electric discharge device members which are to be bonded together with a slurry including at least one metal from the titanium group. For example, a slurry of titanium hydride powder, zirconium hydride powder or a combination of these powders in an amyl acetate and nitrocellulose binder solution is painted on the interface surfaces and along the lower surface of refractory member 14 and to other points where it is intended to form a layer of solder metal. The parts are then assembled as illustrated in Figure 2 and the entire assembly is placed in the jig 21 which is illustrated in Figure 3.

The utilization of a metal hydride powder to form the path over which solder will flow to effect electrical connections is more completely described in my copending application Serial No. 464,080 filed herewith and assigned to the same assignee as this invention.

The jig 21, which is shown merely by way of example, consists of a support arm 22 and contact members 23 and 24 which are spring loaded by spring member 25. The electric discharge device is held in assembled form between members 23 and 24 by the spring member 25 and a metal oven 26 of, for example, tantalum or titanium, titanium being preferred because of the gas gettering qualities thereof, is placed over the assembly and rests on lips 27 and 28. A bell jar member 29 is placed over the assembly and rests on table 30 of an evacuating apparatus 31. Induction heating coils 32 provide the means for heating oven 26, the electric discharge device and solder bath 33. A crucible 34 holds the molten solder bath 33 and is provided with an extendable support 35 to raise the crucible so that the solder bath contacts the lower edges of the metallic members of the electric discharge device. The solder bath is only partly inserted in oven 26 so that it is maintained at a temperature just above the melting point and relatively few solder vapors are present in the region of the discharge device.

In this specific example the tube parts are formed of copper and are separated by refractory members of alumina. The chamber is closed by bell jar 29 and is exhausted by evacuating system 28 while the temperature of the tube and tube parts is raised to a temperature in the order of 850° C. At this high temperature the titanium hydride coating is rapidly decomposed to form a layer of titanium in the interfaces between the two parts, the parts are completely degassed and the enclosure is evacuated. It is noted that no solder vapors are present since the bath 33 is at a lower temperature, i. e. below 600° C. at which the vapor pressure of the solder is not objectionable. When the tube structure is completely degassed and evacuated, the high frequency energy in inductance heating coils 32 is turned off and the electric discharge device cools rapidly. When the temperature of the electric discharge device falls to a temperature in the order of 700° C. the lead solder bath 33 in the crucible 34 is raised to make contact with the lower edges of the copper members of the electric discharge device. The solder metal which may be, for example, of lead, wets almost instantaneously the metal surfaces and the parts of the ceramic which have been painted with the titanium hydride which is now decomposed to titanium. Since the lead has been kept to a temperature in the order of 600° C., the vapor pressure of lead is not troublesome and there is no contamination of the interior of the electric discharge device.

An alternative method is to apply the solder in solid form to the metal parts such as, for example, by raising a solid stick of solder from the base 30 to make contact with each of the metal parts forming the electric discharge device envelope. When this method is utilized the solder very rapidly forms a bond between the metal and ceramic parts which have been coated with the titanium metal hydride. Still another method is to apply solid solder with a coating, for example, of titanium metal hydride applied thereto. With this method no preliminary titanium hydride coating of the parts to be bonded together is necessary and the parts, such as copper, can be heated to temperatures in the order of 1000° C. since there is no titanium present to alloy with the tube parts during bake out and exhaust.

It is noted that either of the first two described methods results in the formation of a solder film over all of the coated parts and completes the interconnection of the internal electric discharge device parts in a single operation. Also with any of these methods, the cathode can be activated during the degassing and sealing operation just described, since the customary triple carbonate cathode coating decomposes and activates at approximately 850° C. Therefore, essentially all steps in the fabrication can be accomplished in a single heating operation.

This soldering technique is ideally suited for utilization in the formation of many forms of electric discharge devices such as miniature electric discharge devices of the disk seal type. A wide range of solder metals may be used such as, for example, lead or aluminum.

Bonds formed in accordance with this invention are capable of sealing members having relatively rough interfaces, in the order of variations of a number of mils, so that it is possible to completely degas and exhaust the interior of a tube structure prior to the application of the solder metal without a special exhaust tubulation although if desired this invention can be readily adapted to discharge device structures having exhaust tubulations. In some instances, it is desirable during the heating cycle to retain the tube structure in an essentially open orientation in order to more effectively exhaust the inner surfaces. In this instance, the structure is closed tightly just prior to the application of the solder so that the solder vapors are effectively shielded from the inner surfaces of the electric discharge device.

Where a particularly high temperature exhaust is desired the tube parts can be formed of tantalum metal and a high temperature ceramic material. An electric discharge device of this type can be heated to an exhaust and degassing temperature of the order of 1350° C. and then cooled to the temperature of the order of 700° C. and sealed in accordance with the above-described method.

It is noted that this method of formation of electric discharge devices utilizes a relatively soft solder or sealing metal such that careful matching of the expansion characteristics of the metal and ceramic members is not necessary as is the case when hard solders and related bonding techniques are utilized.

An alternative method consists of assembling the electric discharge device parts in a manner as previously described with the exception that no titanium hydride painting of the surfaces to be bonded together is necessary; however, the formation of interior mechanical and electrical connections is accomplished in a manner other than that previously described, such as, for example, by placing a nitrocellulose path or other means of carrying a titanium metal alloy to and between the parts to be interconnected. An example of this process is described in my aforementioned application, Serial No. 464,080.

The structure is assembled, degassed and evacuated and then a special solder metal is applied which is formed by vacuum melting a soft solder metal such as lead or aluminum, or combinations thereof, with a small amount of titanium group metal or metals added.

A specific example of such a solder consists of a mixture of approximately 95 percent lead with approximately 5 percent titanium hydride added. This mixture is vacuum melted and heated to approximately 800° C. for a period of from 5 to 10 minutes after which all of the hydrogen in the hydride is liberated. Solder formed in this manner can be applied in solid form or applied in molten form. Solder made in this manner adheres to the ceramic parts with which it comes in contact for a few seconds or more and since the solder flows under the influence of capillary action, it readily forms metallic bonds between members in close proximity to each other.

By making the electric discharge device metal parts from a titanium group metal such as, for example, titanium or zirconium, no painting of the surfaces or alloying of titanium group metals with a solder metal is necessary. The method of assembly, exhaust bake-out, and, if desired, cathode activation, is essentially the same. The solder metal which may, for example, consist of lead, tin, aluminum or combinations thereof, is applied to the tube parts when the temperature of the tube has been reduced to a temperature where the vapor pressure of the solder is not objectionable and above the melting point of the solder to be applied.

It is only necessary to dip the bottom edges of the titanium metal parts in a pot of molten solder metal to effect instant flow of the solder metal around all of the joints thereby sealing the discharge device in one operation.

It is apparent that the methods of this invention provide a novel and improved metallic bond and method of forming a metallic bond which is particularly suited to the formation of vacuum enclosure such as are utilized in electric discharge device fabrication and which effectively seals metal to ceramic and ceramic to ceramic. The delayed soldering technique eliminates the splattering of the solder which often occurs when the hydride decomposes, since the hydride, if used, is fully decomposed by the high temperature pre-firing and degassing of the tube parts. Furthermore, contamination of the interior of the tube parts by lead vapors is eliminated by the application of lead subsequent to the degassing and evacuation of the tube structure.

While this invention has been described in connection with a limited number of specific examples it will be readily apparent that it is subject to a number of modifications and it is intended in the appended claims to cover all modifications coming within the true spirit and scope of this invention.

What I claim as new and desire to secure by Letters Patent of the United States is:

1. The method of fabricating an evacuated envelope having alternate metal and refractory insulating members which comprises assembling the members in a stack in essentially the relative positions occupied in the fabricated envelope, supporting the assembly within an enclosure, heating the assembly to a predetermined temperature while maintaining the enclosure under vacuum to degas said members and evacuate the envelope through the joints between the members, cooling the assembly and immersing at least a portion of the assembly in a molten body of solder having a melting temperature substantially lower than the predetermined temperature to solder the members togethr and seal the envelope.

2. The method of fabricating an electric discharge device including an envelope having alternate metal and refractory insulating members and a cathode within the envelope which comprises assembling the members in a stack in essentially the relative positions occupied in the fabricated device, supporting the assembly within an enclosure, heating the assembly to a predetermined temperature while maintaining the enclosure under vacuum to degas the members, evacuate the envelope through the joints between the members and activate the cathode, cooling the assembly and immersing at least a portion of the assembly in a molten body of solder having a melting temperature substantially lower than the predetermined temperature to solder the members together and seal the envelope.

3. The method of fabricating an electric discharge device including an envelope having alternate metal and refractory insulating members, the metal being selected from the group consisting of titanium, tantalum and zirconium and a cathode within the envelope which comprises assembling the members in a stack in essentially the relative positions occupied in the fabricated device, supporting the assembly within an enclosure, heating the assembly to a temperature in the order of 1350° C. while maintaining the enclosure under vacuum to degas the members, evacuate the envelope through the joints between the members and activate the cathode, cooling the assembly and immersing at least a portion of the assembly in a molten body of solder having a melting temperature substantially lower than 1350° C. to solder the members together and seal the envelope.

4. The method of fabricating an evacuated envelope having alternate titanium and refractory insulating members which comprises assembling the members in a stack in essentially the relative positions occupied in the fabricated envelope, supporting the assembly within an enclosure, heating the assembly to a predetermined temperature while maintaining the enclosure under vacuum to degas the members and evacuate the envelope through the joints between the members, cooling the assembly and immersing at least a portion of the envelope in a molten body of solder within the enclosure, having a melting temperature substantially lower than the predetermined temperature and maintained at a temperature above the melting point of the solder and below the predetermined temperature to solder the members together and seal the envelope while minimizing the vapor pressure of the solder to which the interior of the envelope is subjected.

5. The method of fabricating an evacuated envelope as defined in claim 5 in which the solder is lead, tin, aluminum or alloys thereof.

6. The method of fabricating an evacuated envelope having alternate titanium and ceramic members which comprises assembling the members in a stack in essentially the relative positions occupied in the fabricated envelope, supporting the assembly within an enclosure, heating the assembly to a predetermined temperature to degas the members and effect evacuation of the envelope through the junctions between the members, cooling the envelope to a temperature substantially below said predetermined temperature and applying solder to the junctions between the members to effect the exhaust and sealing of the envelope with a single heating operation.

References Cited in the file of this patent

UNITED STATES PATENTS

| | | |
|---|---|---|
| 2,223,031 | Edwards | Nov. 26, 1940 |
| 2,668,923 | Bondley | Feb. 9, 1954 |
| 2,686,958 | Eber et al. | Aug. 24, 1954 |